United States Patent [19]

Tsuno

[11] Patent Number: 4,458,878
[45] Date of Patent: Jul. 10, 1984

[54] BALL VALVE ASSEMBLY
[75] Inventor: Kazuhiko Tsuno, Nobeoka, Japan
[73] Assignee: Asahi Yukizai Kogyo Co., Ltd., Nobeoka, Japan
[21] Appl. No.: 285,780
[22] Filed: Jul. 22, 1981
[30] Foreign Application Priority Data Mar. 31, 1981 [JP] Japan .............................. 56-46130[U]

[51] Int. Cl.$^3$ ............................................ F16L 37/28
[52] U.S. Cl. .................................... 251/152; 285/354; 285/404
[58] Field of Search ............... 285/354, 404; 251/148, 251/152

[56] References Cited
U.S. PATENT DOCUMENTS 3,134,615  5/1964  Cator ................................. 285/404
3,310,323  3/1967  Galloway et al. ................... 285/404
4,023,773  5/1977  Wise ................................... 251/148
4,103,865  8/1978  Namba et al. ....................... 251/148

Primary Examiner—A. Michael Chambers
Attorney, Agent, or Firm—Fleit, Jacobson, Cohn & Price

[57]  ABSTRACT

The invention starts from such a conventional ball valve assembly which includes a valve body, a valve ball, each pair of unions, body caps and cap nuts arranged symmetrically at the both sides of the said valve ball. There are provided retaining plates or pins extending laterally for positioning the unions relative to the valve body. These small retainer plates or pins are inserted through perforations formed through the wall of the valve body. In addition, the unions are formed with ring grooves adapted for receiving the root portions of these retainer plates or pins.

3 Claims, 10 Drawing Figures

BALL VALVE ASSEMBLY

BACKGROUND OF THE INVENTION

This invention relates broadly to improvements in and relating to ball valve assemblies, and more specifically, it concerns with improvements in and relating to ball valve assembly comprising a stationary hollow valve body, a horizontally hollow valve ball element turnably mounted therein, a vertically arranged valve stem mechanically coupled with said valve ball element and extending vertically from inside of the interior of said valve body and protruding therefrom, a hand knob or wheel detachably coupled with said valve stem at its protruding end, a pair of hollow unions spigotted into the both hollow ends of said valve body, a pair of body caps kept in contact with said unions substantially in concentric arrangement and a pair of cap nuts kept in screw engagement with said valve body so as to hold these cap nuts and unions in position.

It is a conventional drawback, that the downstream side union is frequently pushed out of position outwardly under the influence of the fluid pressure, when the downstream side cap nut has been loosened out for the execution of O-ring exchange or the like job with the valve assembly fitted in a piping system.

SUMMARY OF THE INVENTION

It is, therefore, an object of the present invention to provide such an improved ball valve assembly which is provided with union dislocation preventing means for avoiding the aforementioned conventional drawback.

For this purpose, the union is formed with a ring groove for receiving the root portion(s) of one or more retaining means, each preferably formed into a pin or small plate as an example, said retaining means being normally introduced in position from outside and through properly designed perforation(s) drilled through the cylindrical walls of the valve body nearly at the both ends thereof.

This and further objects, features and advantages of the invention will become more apparent as the description proceeds by way of example of a single embodiment of the invention and in comparison with a conventional comparative ball valve assembly.

DETAILED DESCRIPTION OF THE INVENTION

Referring now to FIGS. 1-4, a conventional comparative ball valve assembly will be briefly described, in advance of the initiation of the description of a preferred embodiment of the invention and, indeed, for better understanding of the latter.

Figure 1:
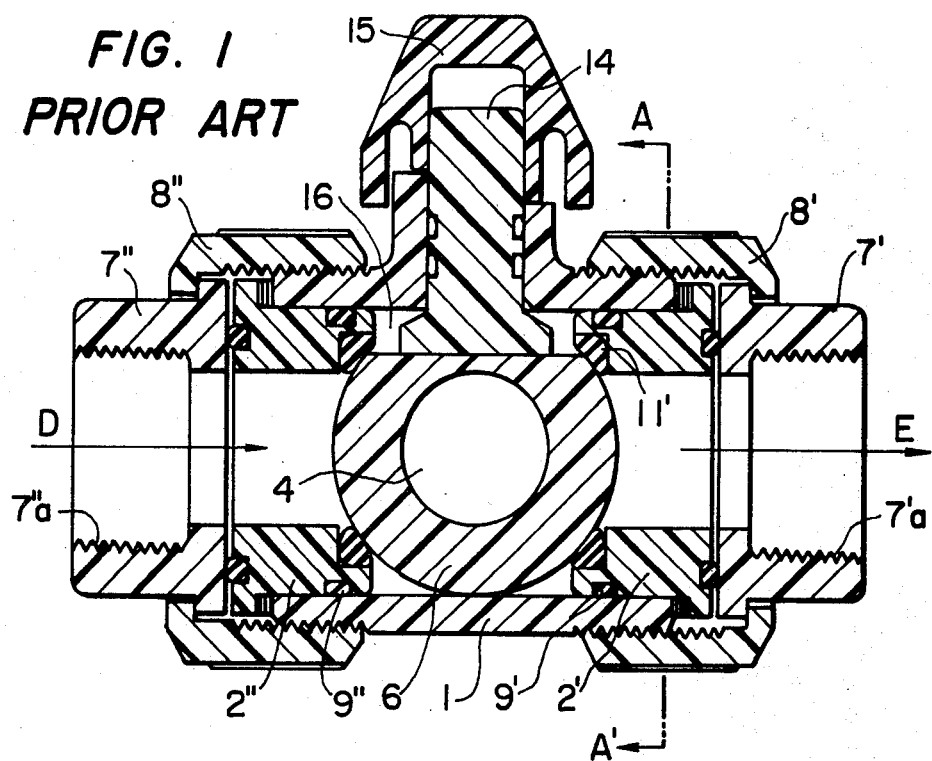
FIG. 1 is a longitudinal section of a conventional ball valve assembly shown in its full stop position and as being fitted in a piping system although the latter per se has been omitted from the drawing only for simplicity thereof.
Figure 3:
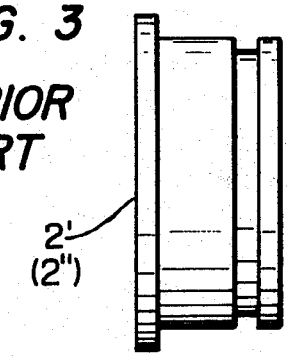
FIG. 3 is a side view of a union employed in the ball valve assembly shown in FIGS. 1 and 2.
Figure 2:
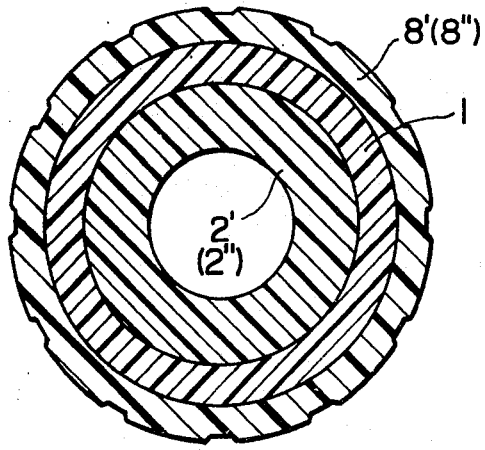
FIG. 2 is a cross-section thereof taken along a section line A—A' shown in FIG. 1.
Figure 4:
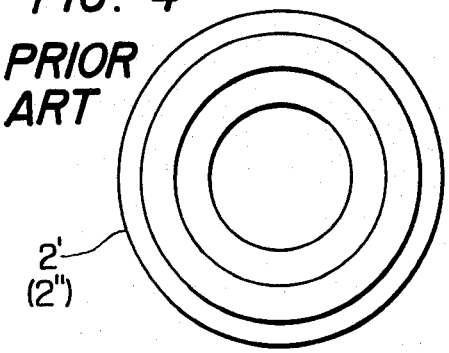
FIG. 4 is a front view of the union.
Figure 5:
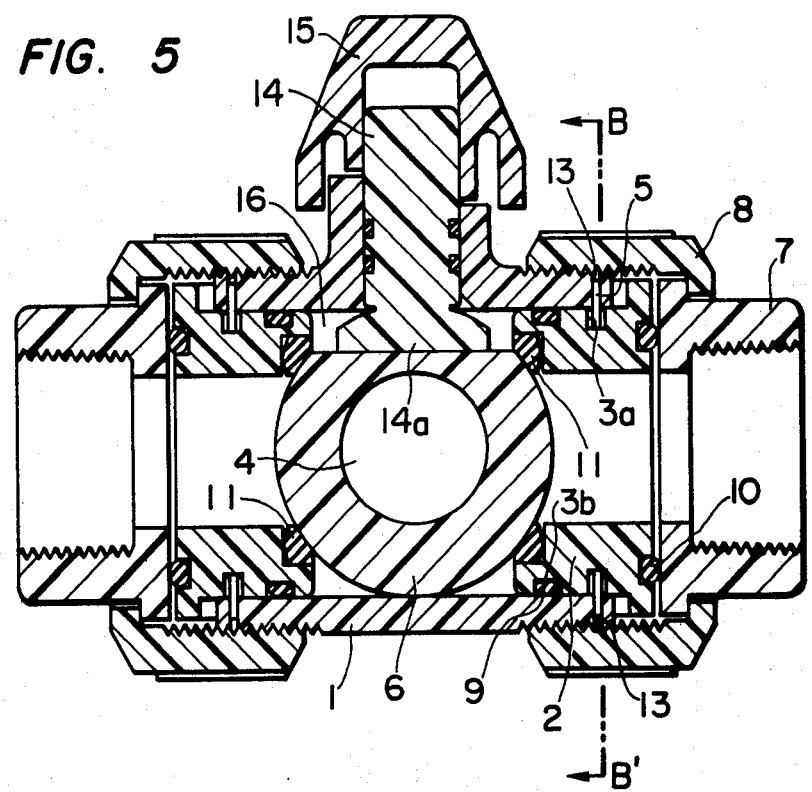
FIG. 5 is a longitudinal section of an embodiment of the inventive ball valve assembly.
Figure 6:
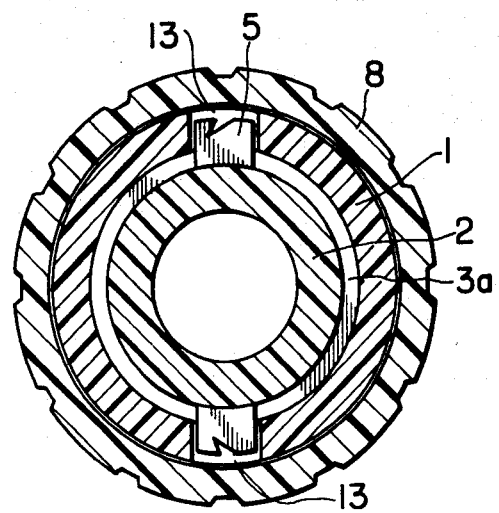
FIG. 6 is a cross-section thereof, taken along a section line B—B' shown in FIG. 5.

It will be seen that when cap nut 8', for instance, positioned at the downstream side is disengaged from position shown, ball 6 and union 2' will be pushed out towards the right in FIG. 1 under upstream side fluid pressure prevailing at the left hand side of FIG. 1, since there is only one mechanical connection between union 2' and valve housing 1 at O-ring 9'. Several corresponding upstream side parts are shown with respective same numerals which are, however, double-primed for clear and better identification from those of the downstream side.

Numeral 4 represents a concentric axial flow passage bore which is bored through the valve ball 6.

Further, numeral 7' represents a downstream side body cap which is coupled with the said union 2' in position by tightening the union 2'.

Arrow D represents upstream side flow direction and arrow E shows downstream side flow direction, appearing when the valve ball 6 has been brought into its valve opening position from its closed position shown in FIG. 1, by turning the valve ball just 90 degrees by manipulating an operating knob 15 (or hand wheel, not shown) attached fixedly with valve stem 14 at its top end.

The attachment of knob 15 with valve stem 14 may be made by known any conventional means such as pressure fit and/or lateral positioning pin(s) although not shown.

The root end 14a of valve stem is enlarged as shown and slid into a groove 16a formed at top portion of valve ball 6, so as to provide a detachable mechanical connection in the form of a tongue-and-groove connection as an example.

Body caps 7' and 7" are formed respectively with female screw threads 7'a and 7"a which receive adjacent male-threaded pipe elements of the pipe line, although not shown.

Next, referring to FIGS. 5-10, an embodiment of the inventive ball valve assembly will be described in detail. However, for simplicity of the description as well as the drawing, substantially downstream side members only will be illustrated with reference numerals, while those which are positioned at the upstream side are shown with no reference numerals, since the structure and function of these parts have already been described in the foregoing.

Figure 7:
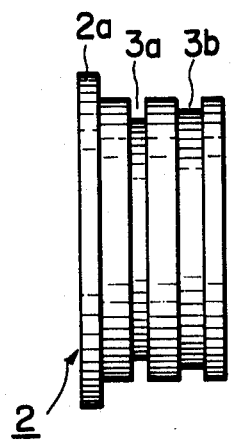
FIG. 7 is a side view of an improved union included in the improved valve assembly.
Figure 8:
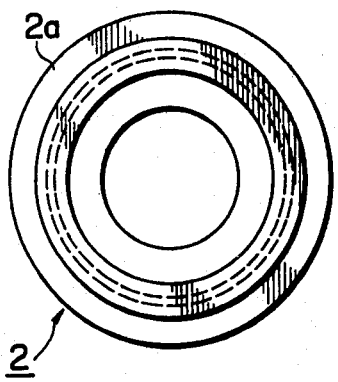
FIG. 8 is a front view of the union.
Figure 9:
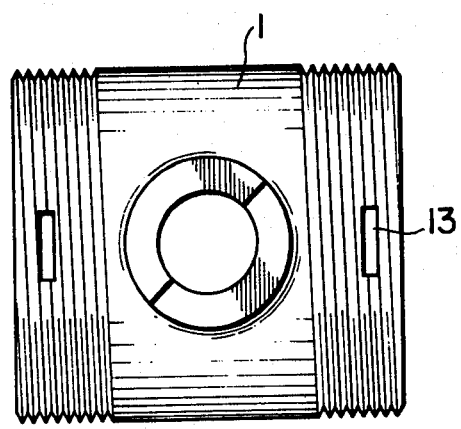
FIGS. 9 and 10 are a top plan and a cross sectional view of an improved valve body embodying a feature of the invention and shown in FIGS. 5 and 6.
Figure 10:
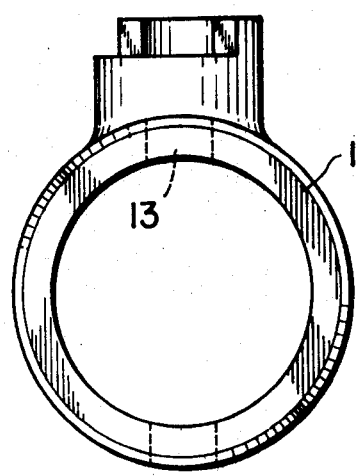

As may be most clearly seen from FIG. 7, union 2 is formed with a flange 2a and a first and second ring grooves 3a and 3b, respectively. First groove 3a is adapted for engagement with a blocking or retaining means, made preferably into a small plate 5 or pin. Second groove 3b is adapted for O-ring 9 which acts to establish an effective seal between the substantially hollow cylindrical valve housing 1 and union 2.

Gasket seats as at 11 are provided at upstream and downstream sides in the valve assembly for establishing an effective seal between the valve ball 6 and unions as at 2.

For keeping the blocking plates 5 in position shown, the valve housing 1 is formed near its outer ends with reception openings 13.

In this way, even when one or both unions 2 has/have been dismantled from position, either or both of these unions is/are held substantially in position even if upstream side fluid pressure acts upon the union(s) through the valve ball. In this way, disadvantageous push-off of the valve ball and either or both unions from position can be substantially prevented by the retaining action of these blocking means as at 5, even if the cap nut or cap nuts has or have been dismantled from the valve assembly with the valve ball kept wholly or partially at its fluid blocking position, and indeed, thanks to the mechanical connection by means of blocking means 5 between the valve housing and the union(s).

Provision of O-ring 9 between the union and the valve body and of a further O-ring 10 between the union and the body cap, fluid escape through the perforations as at 4 formed through the wall can be effectively prevented.

The embodiments of the invention in which an exclusive property or privilege is claimed are as follows:

1. A ball valve assembly comprising:
   a hollow tubular valve ball having a central axis defining a flow path, said valve body including axially spaced reception openings extending therethrough,
   a valve ball rotatably received in said valve body to rotate about an axis transverse to said central axis, said valve ball including a flow passage that can be aligned with said flow path,
   a pair of unions, each of which is positioned within said valve body and on opposite sides of said valve ball, each of said unions having an external annular ring groove;
   end caps removably carried by said valve body to act against each of said unions to urge them into contact with said valve ball, and
   retaining means extending laterally into said reception openings in said valve body and into said ring grooves in said unions for axially retaining said unions relative to said valve body when said end caps are removed.

2. The ball valve assembly of claim 1, wherein said retaining means are in the form of plates.

3. The ball valve assembly of claim 1, wherein said retaining means are in the form of pins.

* * * * *